(12) United States Patent
Kojima

(10) Patent No.: US 6,184,859 B1
(45) Date of Patent: Feb. 6, 2001

(54) PICTURE DISPLAY APPARATUS

(75) Inventor: Kiyonobu Kojima, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/635,010

(22) Filed: Apr. 19, 1996

(30) Foreign Application Priority Data

Apr. 21, 1995 (JP) .................................................. 7-096633
Mar. 29, 1996 (JP) .................................................. 8-077977

(51) Int. Cl.[7] ....................................................... G09G 5/26
(52) U.S. Cl. ......................... 345/130; 345/113; 345/435; 345/147; 345/139; 345/132
(58) Field of Search .................... 345/113, 114, 345/127, 130, 112, 121, 147, 139, 345, 439, 435, 132

(56) References Cited

U.S. PATENT DOCUMENTS

| | | | | |
|---|---|---|---|---|
| 4,149,184 | * | 4/1979 | Giddings et al. | 345/147 |
| 4,734,619 | * | 3/1988 | Havel | 345/114 |
| 4,790,028 | * | 12/1988 | Ramage | 345/127 |
| 4,924,299 | * | 5/1990 | Mizuno et al. | 345/113 |
| 5,187,776 | * | 2/1993 | Yanker | 345/121 |
| 5,371,512 | * | 12/1994 | Otake et al. | 345/114 |
| 5,426,725 | * | 6/1995 | Kilgore | 345/114 |
| 5,473,737 | * | 12/1995 | Harper | 345/114 |
| 5,638,523 | * | 6/1997 | Mullet et al. | 345/130 |
| 5,651,107 | * | 7/1997 | Frank et al. | 345/435 |

FOREIGN PATENT DOCUMENTS 4-337800   11/1992   (JP) .................................. G09G/5/36

OTHER PUBLICATIONS

U.S. application No. 08/719,793, filed Sep. 25, 1996, "Apparatus and Method for Controlling Image Display".

* cited by examiner

Primary Examiner—Kent Chang
(74) Attorney, Agent, or Firm—Limbach & Limbach, LLP

(57) ABSTRACT

A picture display apparatus for enlarging a portion of a picture displayed on a screen for display on the same screen. The picture display apparatus includes a display unit having a display screen on which a picture is displayed, a specifying unit for specifying an optional area of an overall picture displayed on a display screen of the display unit, a magnified picture generating unit for generating a magnified picture of the area specified by the specifying unit, and a display control unit for superimposing the magnified picture on the overall picture in such a manner that the magnified picture is superimposed on the overall picture and the portion of the overall picture overlapped below the magnified picture is rendered visible and displayed on the display screen of the display unit. Since a magnified picture is superimposed on an overall picture for prohibiting the display from being divided into two portions, the viewer is not fatigued and is safeguarded against mistaken recognition, while the picture portion desired to be viewed may be designated easily, while the picture may be seen as the picture is magnified smoothly continuously.

9 Claims, 10 Drawing Sheets

PICTURE DISPLAY APPARATUS

BACKGROUND OF THE INVENTION

1. Field of the Invention

This invention relates to a picture display apparatus for magnifying a portion of a picture displayed on a screen for display on the same screen.

2. Description of the Related Art

In general, if, when displaying a picture, such as a character, figure or a photo on a display, such as a cathode ray tube (CRT), it is desired to improve decipherability of fine-textured portions of a picture, it is necessary to display a picture of the fine-textured portions to a more or less enlarged scale. Since the display area on the screen is of a limited size, a so-called scroll function of displaying the new information by sequentially feeding the new information on upper, lower, left and right portions of the display area. With this scrolling function, if scrolling is done in the downward direction, the information displayed at an uppermost portion of the display area disappears from the display area and hence ceases to be displayed.

The above-described technique has a drawback that, since the information in its entirety cannot be viewed on the display, it is not apparent at which position of the entire information the currently displayed information is located, while it is difficult to designate the picture portion desired to be viewed.

For overcoming this deficiency, the present Assignee has disclosed in JP Patent Kokai Publication JP-A-4-337873 (1992) a picture display apparatus in which two display portions, that is a display portion for displaying the entire information and a display portion for displaying a partial information to an enlarged scale, are provided on one and the same display screen.

In the picture display apparatus, disclosed in the above Publication, an overall display portion 1 for accommodating the entire information and a magnified display portion 2 are provided on the display screen, as shown in FIG. 1. The magnified display portion 2 is designed for displaying the contents of a rectangular display portion 5 pointed by a cursor 4 in the overall display portion 1 to an enlarged scale. In U.S Pat. No.4,751,507, FIG. 5, there is similarly disclosed a technique of displaying an overall picture 1 and a partial magnified picture designated by the cursor in separate regions of one and the same screen.

However, if a portion of the entire picture is displayed to an enlarged scale as described above, since the information display portion is divided into the overall display portion 1 and the enlarged display portion, the viewer (user of the display apparatus) has to move his or her line of sight frequently in order to view these two portions simultaneously. This leads to fatigued feeling or mistaken recognition. The two display regions, that is the overall display region 1 and the enlarged display region take up a larger portion of the display area on the screen. If rectangular regions are allocated to the overall display region 1 and the magnified display region 2, there is produced on the screen a region 3 not used for display thus obstructing efficient utilization of the display screen. These defects of the apparatus of the above referenced Publications cancel the merits that the relative position of the magnified picture portion in the overall picture can be comprehended easily and the picture portion desired to be viewed to an enlarged scale can be designated easily.

Although it is envisaged to display the magnified display region in superimposition on the overall display region, since the magnified display region is selected by area designation using a cursor displayed on the overall display region and a magnified display region corresponding to the selected display area is displayed in superposition on the overall display region, it becomes difficult to select further a picture portion hidden by the magnified display region. If the picture potion hidden by the enlarged display region is selected and newly displayed to an enlarged scale, it becomes necessary to perform a complex operation of moving the existing magnified display region to a different place or erasing the magnified display region and selecting a region to be displayed next to an enlarged scale for displaying the newly selected region in the new magnified display region.

SUMMARY OF THE INVENTION

It is therefore an object of the present invention to provide a picture display apparatus wherein the relative position of the information currently displayed on the display region with respect to the overall picture can be comprehended easily and the picture portion desired to be viewed can be designated easily.

It is another object of the present invention to provide a picture display apparatus wherein the viewer can view the screen with a smaller amount of the movement of the line of sight and the viewing surface of the screen can be utilized effectively while the picture may be viewed as the picture is magnified smoothly continuously.

According to the present invention, there is provided a picture display apparatus including display means having a display screen on which a picture is displayed, specifying means for specifying an optional area of an overall picture displayed on a display screen of the display means, magnified picture generating means for generating a magnified picture of the area specified by the specifying meas, and display control means for superimposing the magnified picture on the overall picture in such a manner that the magnified picture is superimposed on the overall picture and the portion of the overall picture overlapped below the magnified picture is rendered visible and displayed on the display screen of the display means.

According to the present invention, a magnified picture is superimposed on an overall picture for prohibiting the display from being divided into two portions. In addition, since the portion overlapped below the magnified picture is visibly displayed so that it becomes possible to comprehend the relative position of the magnified picture in the overall picture.

According to the present invention, since a magnified picture is superimposed on an overall picture for prohibiting the display from being divided into two portions, the viewer is not fatigued and is safeguarded against mistaken recognition. In addition, the picture portion desired to be viewed may be designated easily, while the picture may be seen as the picture is magnified smoothly continuously.

DESCRIPTION OF THE PREFERRED EMBODIMENTS

Figure 1:
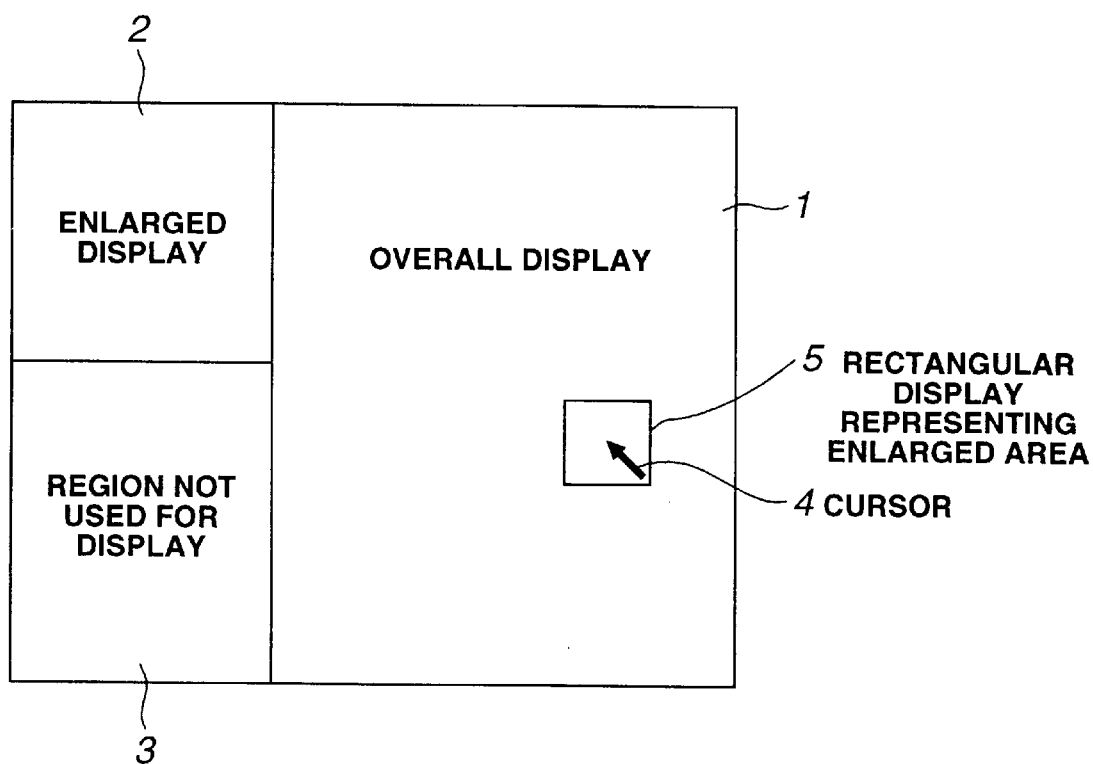
FIG. 1 illustrates an example of a layout for a conventional display.

Referring to the drawings, preferred embodiments of the present invention will be explained in detail.

Figure 2:
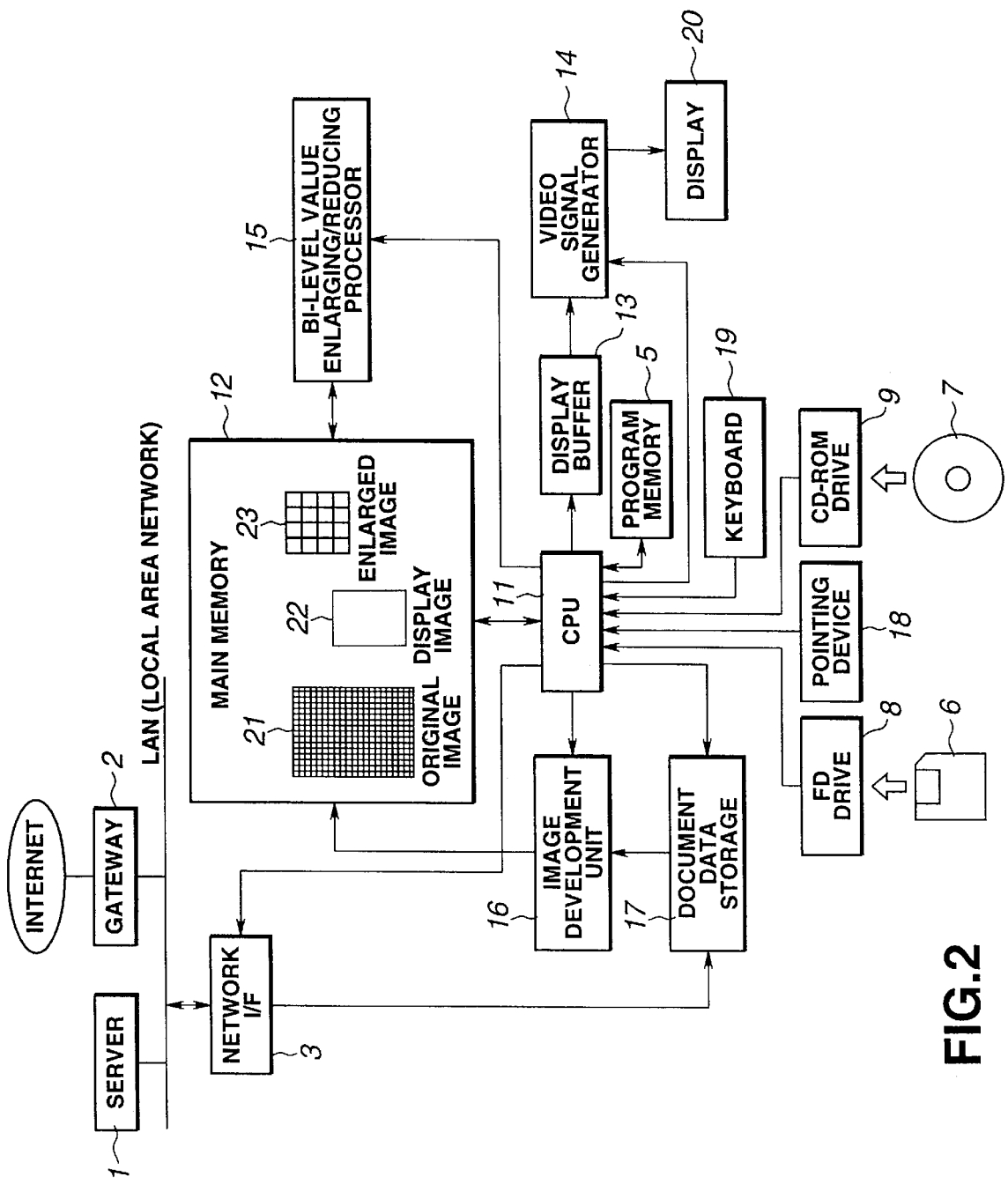
FIG. 2 is a schematic block diagram showing an arrangement of a picture display apparatus according to a first embodiment of the present invention.

Referring first to FIG. 2, the system configuration of the picture display apparatus according to a first embodiment of the present invention will be explained.

Referring to FIG. 2, a server 1 and a gateway 2 is connected to a LAN (local area network). This LAN is constructed by ethernet, token ring or the like and is connected via the gateway 2 to a computer network known as an internet. Data transmission may be made between computers connected to a global computer network via this internet (between a server and a client). The gate way 2 also has the function of an accessing limiting function known as a fire wall for prohibiting unauthorized intrusion to a local network such as a company-wide network, or a function known-as a proxy, that is the function of cashing data transferred from the server a pre-set time for coping with a request from a client for the server actually furnishing data for dispensing with re-loading file data designated by a frequently accessed specified uniform resource locator (URL) for relieving the load on the entire network.

In the present embodiment, a network interface (IF) 3 receives data furnished from the server 1 or the internet via LAN and supplies the data to a document data storage unit 17 for storage therein. The document data storage unit 17 may be constructed by a solid memory in addition to a hard disc, an optical disc or a magneto-optical disc. The data structure stored in the document data storage unit 17 may be image data, image data compressed by MMR (modified modified REA) or MH (modified Huffman), text data, page descriptive language such as postscript employed for DTP, or text or picture layout descriptive language such as HTML (hyper text markup language) employed a WWW (world-wide web).

On the other hand, a CPU 11 processes pictures on the basis of the computer software pre-stored in a program memory 5 constructed by a hard disc or a RAM in accordance with the processing sequence as will be explained subsequently. That is, the computer software stored in the program memory 5 is readable and executable by the CPU 11 and includes a step of generating a magnified picture of an area specified by the specifying means, and superimposing the magnified picture on the overall picture in such a manner that the magnified picture is superimposed on the overall picture and the portion of the overall picture overlapped below the magnified picture is rendered visible and displayed on the display screen of the display. This computer software is sold or distributed to the user in a state in which it is stored in a package medium such as a floppy disc (FD) 6 or a CD-ROM 7 (a read-only memory employing a compact disc). As the user inserts the FD 6 or the CD-ROM 7 into an FD-ROM 8 or the CD-ROM drive 9, the computer software stored in the FD 6 or the CD-ROM 9 is read out by the FD drive 8 or the CD-ROM drive 9 so as to be stored by the CPU 11 into a program memory 5.

The computer software may also be supplied from the server 1 via LAN or the internet, in which case the computer software program received by the network I/F 3 is transiently stored in the document data storage unit 17 and subsequently stored in the program memory 5 by the CPU 11. In FIG. 2, the CPU 11 commands for the document data storage unit 17 an address of data associated with a file name commanded to be displayed by, for example, a keyboard 19. The file data stored in the document data storage unit 17 is read out responsive to the commands from the CPU 11 so as to be sent to an image development control unit 16.

The image development control unit 16 processes data read out from the document data storage 17 in accordance with a data format stored therein and converts the data into bit-map format data. That is, if the data stored in the document data storage unit 17 is compressed image data compressed in accordance with the system of the group 3 (G3) or the group 4 (G4) of CCITT generally accepted as the facsimile standard, the data is expanded in accordance with the standard. On the other hand, if the data is, for example, the text information, it is developed into image data on the basis of the character font information. In addition, if the data from the document data storage unit 17 is a mixture of the compressed image data and the text information, these are processed separately and the produced data are synthesized to form developed image data in the image development control unit 16. The image development unit 16 is made up of a compression/ expansion chip for G3 and G4, or comprised of a hardware termed a page interpreter and a corresponding software. Alternatively, the image development control unit 16 may be implemented in its entirety by software. Data obtained by processing by the image development control unit 16 is stored in an original image storage area 21 in the main memory 12 controlled as to the addresses and writing/readout by the CPU 11.

The image data stored in the original image storage area 21 of the main memory 12, termed original image data, is read out in accordance with address control by the CPU 11 and sent to an enlarging/reducing processor 15. The enlarging/reducing processor 15 is responsive to commands by the CPU 11 to transform resolution for matching to display resolution of a display 20 as display means. The image data processed by the enlarging/reducing processor 15 is stored in a display image storage area 22 which is a separate area in the main memory 12. The CPU 11 reads out image data in the display area 22 (display image data) from the main memory 12 to store the data transiently in a display buffer 13. The stored display image data is then read out therefrom and sent to a video signal generating circuit 14.

The video signal generating circuit 14 generates picture signals from the display image data transmitted from the display buffer 13. These picture signals are sent to the display 20 so that a picture, that is a display image, corresponding to the display image data is displayed on the display 20.

Figure 3:
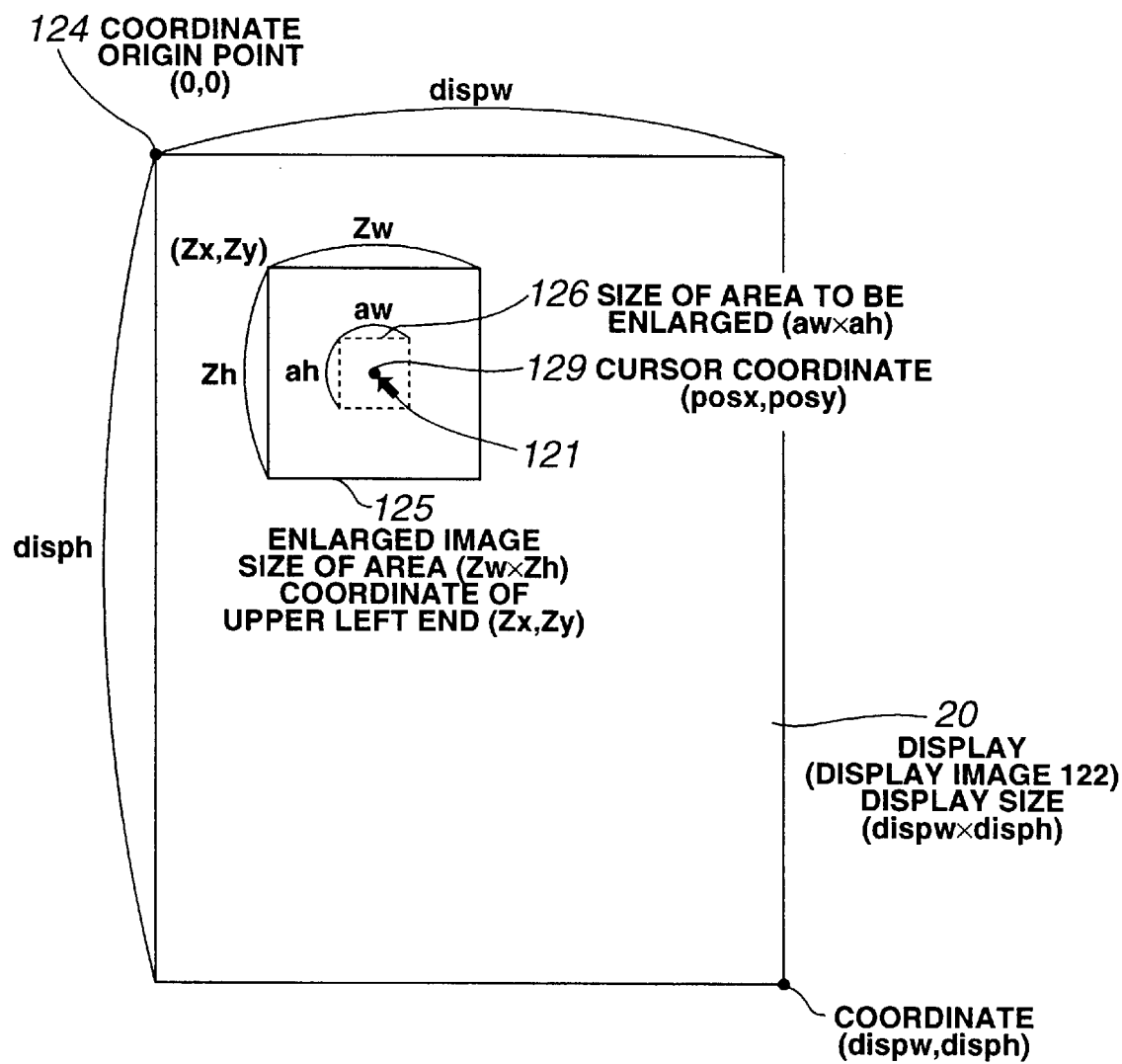
FIG. 3 illustrates a display image on a display, designation of an object to be enlarged and an enlarged image.

On the display 20, on which is displayed a display image 122, a cursor 121, the display coordinates of which are controlled by a pointing device 18, such as a mouse, is displayed via the CPU 11, as shown in FIG. 3.

It is now assumed that the user of the display apparatus operates on the pointing device 18 for moving the cursor 121 to a portion of the display image 122 on the display 20 desired to be displayed to an enlarged scale (an area to be magnified 126), and presses a magnifying button, for example, provided on the pointing device 18 for commanding the portion (the area 126) to be magnified.

At this time, the CPU 11, as display control means, reads out coordinates (posx, posy) 129 as commanded with the cursor 121 and calculates values of coordinate data associated with the original image data stored in the main memory 12 and which is not as yet converted in resolution. These coordinate data are memory address values in the original image storage area 21. In addition, the CPU 11 reads out image data of the relevant area, that is image data of the original image data associated with the area to be magnified 126, and commands the enlarging/reducing processor 15, operating as enlarged picture generating means, to generate enlarged image data of the area to be magnified 126 (magnified image data). This magnified image data is then stored in a magnified image storage area 23.

When the image corresponding to the magnified image data (magnified image) is displayed on the screen, the CPU 11 takes out from the display image storage area 22 of the main memory 12 the image data corresponding to the portion of the display image 122 superimposed with the magnified image 125 on the screen. The display image data thus taken out, that is superimposed display image data, is adjusted in density by the CPU 11 so that the display density on the display 20 will be lowered at a pre-set ratio. The superimposed display image data is then synthesized with the magnified image data in the magnified image storage area 23. The resulting synthesized image is stored in an associated storage area in the display buffer 13 (the area in which the magnified image data is to be stored).

The image data stored in the display buffer 13 (magnified image data and the superimposed image data) is then taken out and sent to the video signal generating unit 14 which then generates picture signals from the image data for display on the display 20. This displays a magnified image 125 on the display image 122, while simultaneously displaying a display image having low display density (thin display density), that is the superimposed display image, below the magnified image 125.

Figure 4:
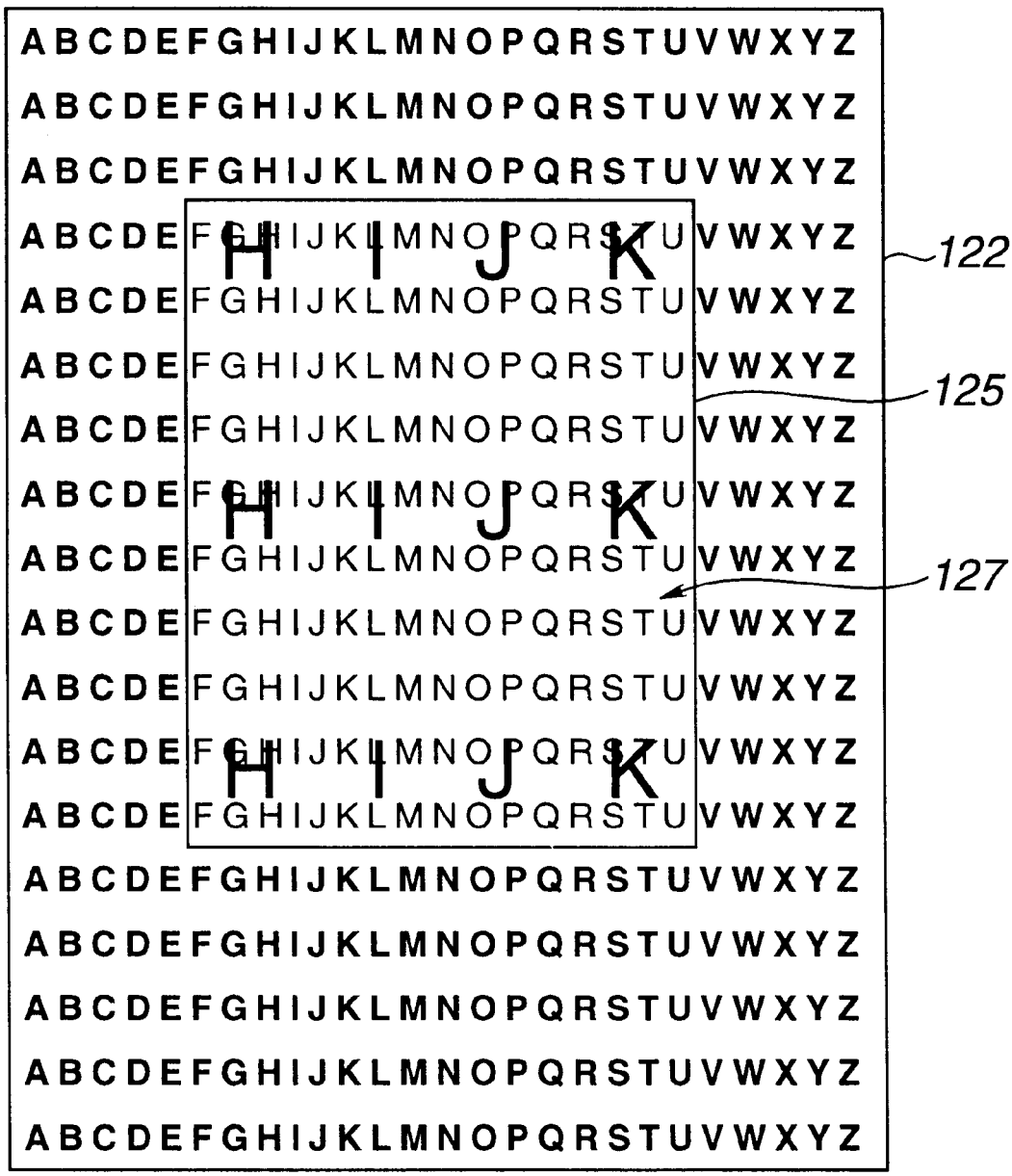
FIG. 4 illustrates illustrative examples of the display image and the enlarged image on the display.

An illustrative example in which the magnified image 125 is displayed on the display image 122 at the same time as a display image superimposed on the magnified image 125 is displayed is shown in FIG. 4. If upper case alphabetical letters A, B, C, D, ... are displayed as the display image 122, and if it is commanded to enlarge part of the display image 122, enlarged letters, such as enlarged image 125, are displayed, while the letters of the display image 122 below the enlarged image 125 are displayed with a lower density as the superimposed display image 127, as shown in FIG. 4.

Figure 5:
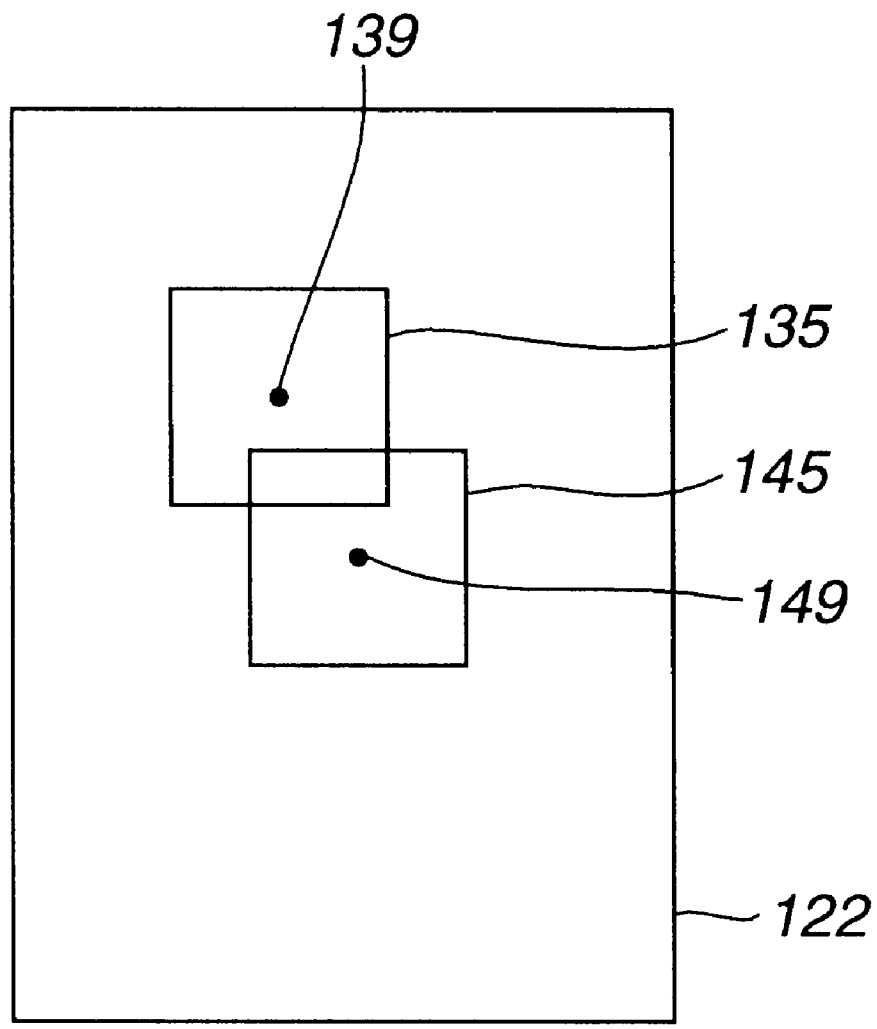
FIG. 5 illustrates movement of a region to be enlarged.

If, when the above display is made, the cursor 121 is moved by the pointing device 18, an enlarged image, that is part of the overall display image displayed to an enlarged scale, and a superimposed display image therebelow, are synthesized to effect new display. Referring to FIG. 5, if an enlarged image 135 (old enlarged image) has been displayed in association with the previously designated cursor coordinate (old cursor coordinate) the cursor 121 is moved by the pointing device 18 to designate a new cursor coordinate 149, image data taken out from the display image storage area 22 of the main memory 12 in association with the new cursor coordinate 149 is magnified, at the same time as the portion of the display image data superimposed with the magnified image data is adjusted in density. The magnified image data and the superimposed display image data thus produced are synthesized to from a new magnified image 145 for display on the display 20. The display image data in the portion where the old enlarged image 135 has been displayed is restored to the usual density and displayed by taking the difference from the coordinate area in the new enlarged image 145 for overwriting on the display buffer 13.

The above-described sequence of operations is repeated until pressing on the magnifying button provided in the pointing device 18 is released.

Figure 6:
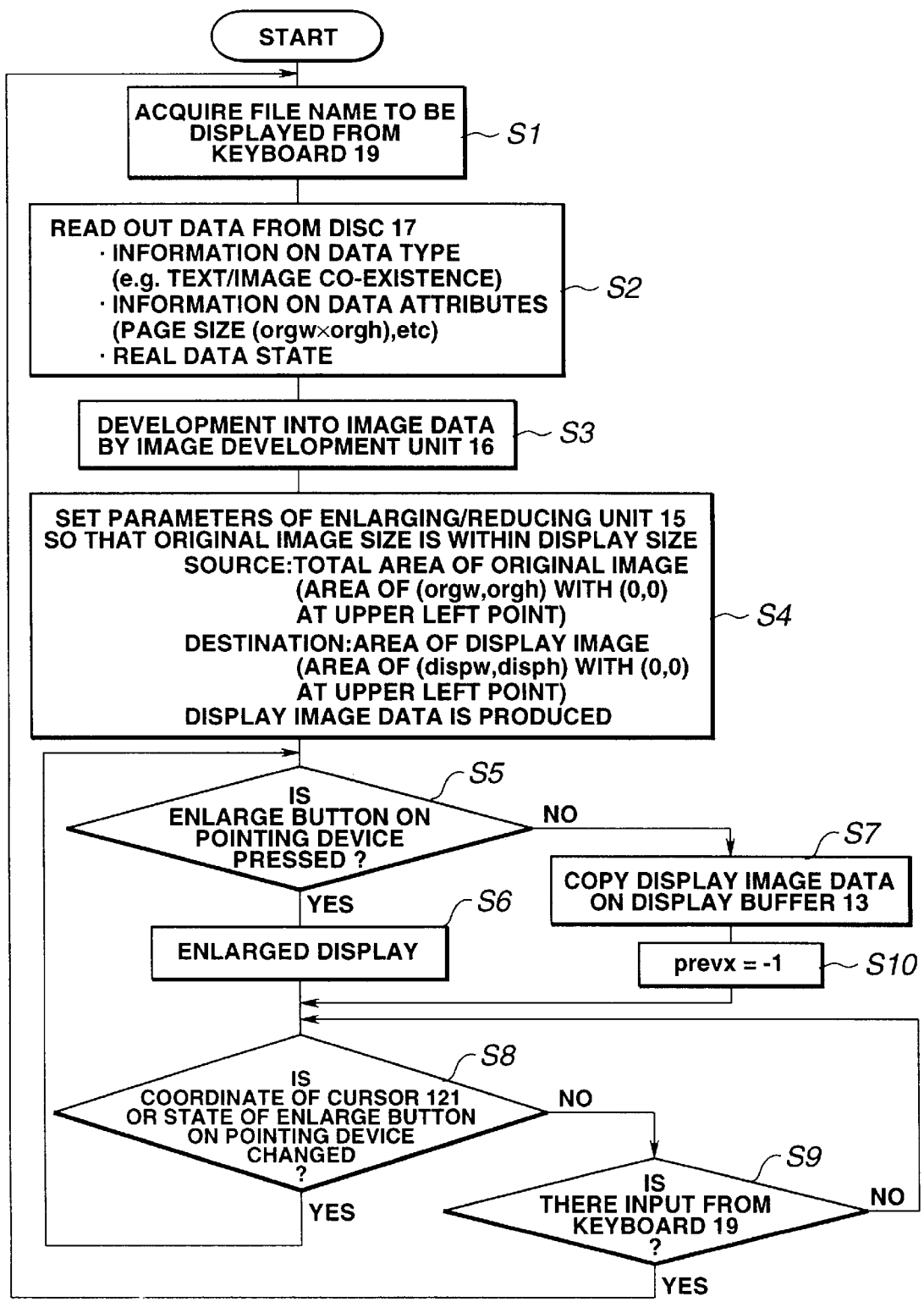
FIG. 6 is a flowchart for showing the overall processing flow of the first embodiment.
Figure 7:
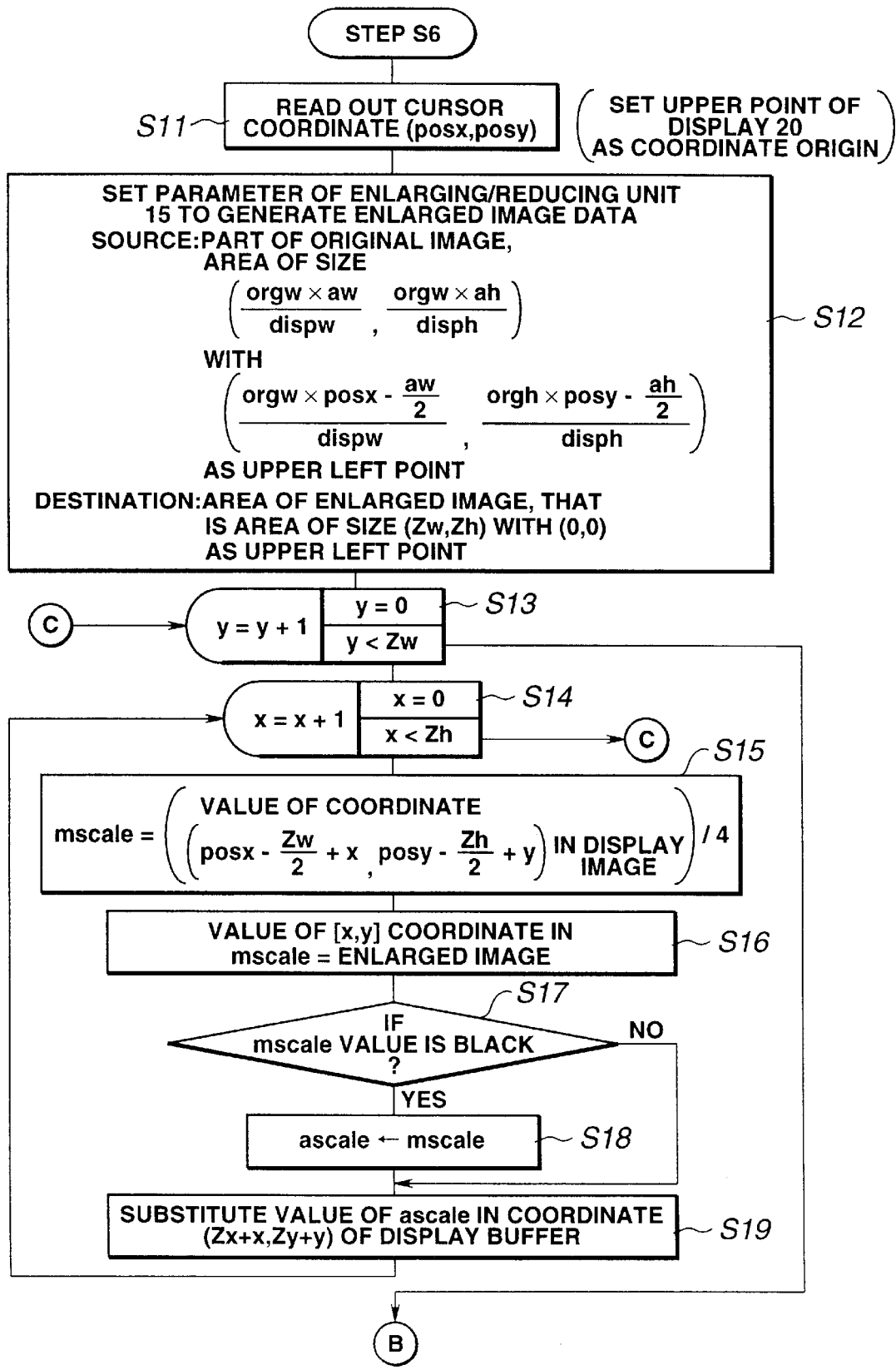
FIG. 7 is a flowchart showing the former half portion of the enlarged display processing of the flowchart of FIG. 5.
Figure 8:
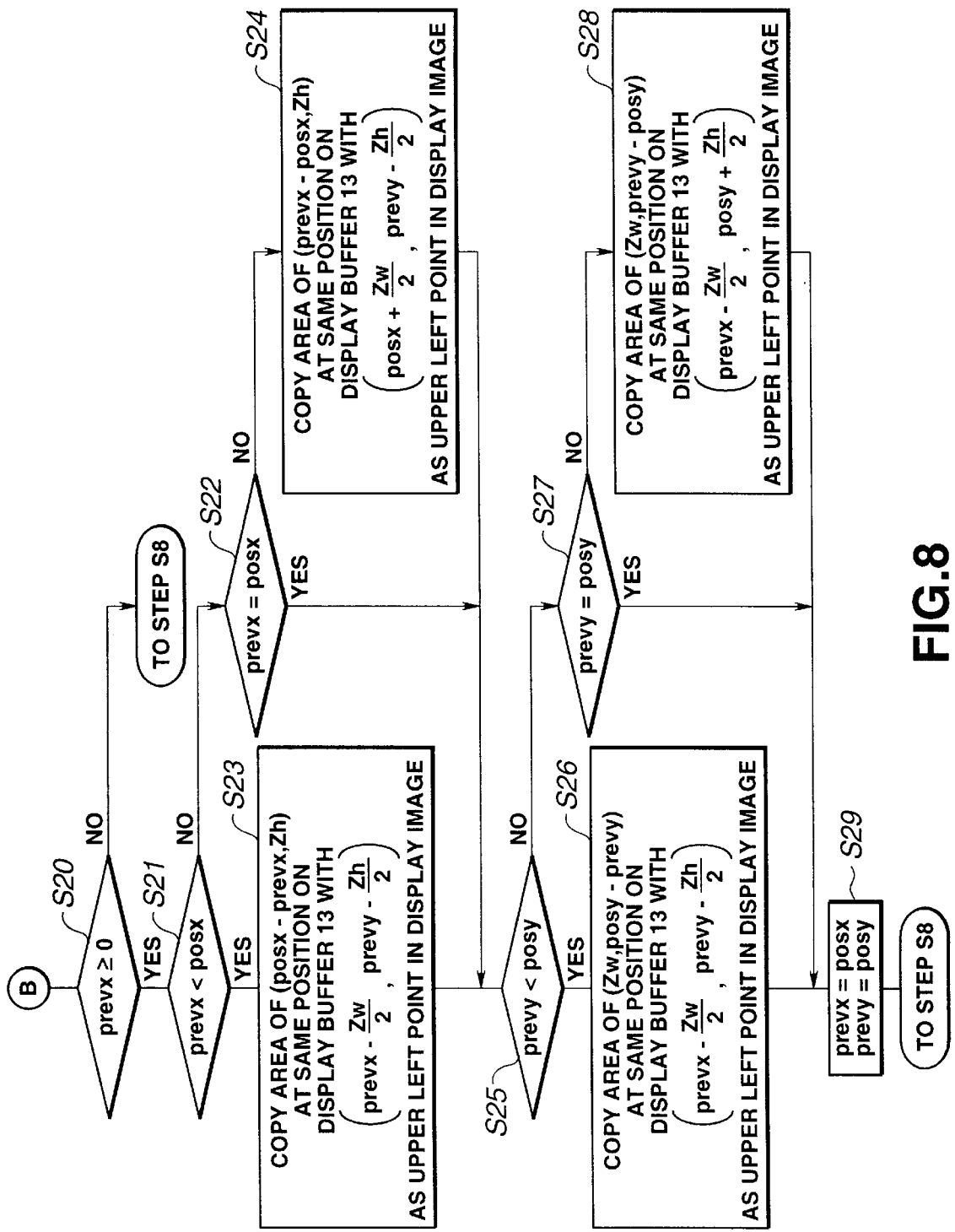
FIG. 8 is a flowchart showing the latter half portion of the enlarged display processing of the flowchart of FIG. 5.

The above-described operations are explained in further detail by referring to the flowchart of FIGS. 6 to 8.

Referring first to FIG. 6, the CPU 11 acquires the file name at step S1 from the keyboard 19. At step S2, the CPU 11 reads out data from the document data storage unit 17 responsive to the file name. At this time, the CPU 11 acquires the information concerning the data type, that is the information as to whether the data is the text information, image data or a mixture thereof, the information specifying data attributes, such as page size (orgw×orgh) and data itself.

At the next step S3, data read out form the disc 17 is developed into image data by the image development control unit 16. Processing then transfers to step S4.

At step S4, the parameters of the enlarging/reducing processor 15 are set so that the size of the original image (orgw×orgh) is accommodated within the screen of the display 20 (within the display size dispw×disph). For example, if the total area in the original image storage area 21 corresponds to an area extending from the coordinate (0,0) as far as the coordinate (orgw, orgh), with the upper left point of the area corresponding to the coordinate (0,0), the display image data corresponding to an area extending from the coordinate (0,0) as far as the coordinate (dispw, disph) on the display screen on the display 20 is generated by the enlarging/reducing processor 15. The display image data is written in the display image storage area 22 of the main memory 12. After step S4, processing transfers to step S5.

At step S5, it is judged whether or not the magnifying button provided on the pointing device 18 has been pressed. If, st step S5, it has been judged that the magnifying button has not been pressed, processing transfers to step S7. At step S7, the display image data stored in the display image storage area 22 is copied in the display buffer 13. Processing then transfers to step S10 where the variable prevx is set to −1. The variables prevx, prevy are used to hold the cursor coordinates magnified and displayed directly previously, as explained later. Thus, −1 specifies that magnified display is currently not left. If it is found at step S5 that the magnifying button has been pressed, processing transfers to step S6 for enlargement and display. Processing then transfers to step S8.

At step S8, it is judged whether or not the coordinate specified by the cursor 121 has been changed. If it is found that the coordinate specified by the cursor 121 has not been changed, it is judged at step S9 whether or not an input has been made from the keyboard 19. If it has been found that there is no input from the keyboard 19, processing reverts to step S8. If it has been found that there is an input from the keyboard 19, processing reverts to step S1. If it is found at step S8 that the coordinate of the cursor 121 has been changed, processing reverts to step S5.

Referring to the flowcharts of FIGS. 7 and 8, the enlargement and display at step S6 is explained.

If it has been judged at step S5 that the magnifying button has been pressed, the processing of step S11 of FIG. 7 is performed at step S6. At step S11, the coordinate 129 (posx, posy) of the cursor 121 is read out before processing transfers to S12.

At step S12, the parameter of the enlarging/reducing processor 15 is set for generating magnified image data. If part of the original image is an area having a size of (orgw*aw/dispw, orgh*ah/disph), having the coordinate ((orgw*(posx−aw/2))/dispw, (orgh*(posy−ah/2))/disph) as an upper left end point, the area of the magnified image becomes an area having the size of (zw, zh) and having the coordinate (0,0) as the upper left point.

At step S13, it is judged whether or not, for a variable y having an initial value y=0, y<Zw. If x>Zh, y is incremented and, if x<Zh, processing transfers to step S15.

At step S15, the value of the coordinate (Zx+x, Zy+y) in the display image is multiplied by ¼ to give a variable scale. The larger the coordinate value, the higher becomes the black density on the display. At the next step S16, the value of the coordinate (x,y) in the enlarged image is set to a variable mscale. Processing then transfers to step S17.

At step S17, it is judged whether or not the value of the variable mscale indicates black. If the value indicates black, the value of the variable mscale is substituted into the variable scale before processing transfers to step S19. If the value of the variable mscale is not black, processing transfers to step S19.

At step S19, the value of the variable ascale is substituted into the coordinate ($Z_{x+y}$, $Z_{x+y}$) of the image data in the display buffer 13. Processing then reverts to step S14 to increment x.

At step S20 of FIG. 8, to which processing transfers when it is judged at step S13 that y>Zw, it is judged whether or not the x-coordinate prevx, previously specified by the cursor 121, is not less than 0, that is whether or not prevx>0. If prevx <0, processing reverts to step S8. Since then, and up to step S29, the difference area between the magnified image displayed directly previously and the magnified image presently displayed is reset to the original state. Since the prevx equal to −1 specifies that there is no magnified image, the processing proceeds further.

At step S21, it is judged whether or not prevx<posx. If prevx<posx, processing transfers to step S23 and, if prevx>posx, processing transfers to step S22.

At step S23, an area of the display image having a size (posx−prevx, Zh) with the coordinate (prevx−Zw/2, prevy−Zh/2) as the upper left end is copied at the corresponding position on the display buffer 13. Processing then transfers to step S25.

At step S22, it is judged whether or not prevx=posx. If prevx=posx, processing transfers to step S25 and, if prevx is not equal to posx, processing transfers to step S24.

At step S25, it is judged whether or not prevx<posy. If prevx<posy, processing transfers to step S26 and, if prevx>posy, processing transfers to step S27.

At step S26, an area of the display image having a size up to a coordinate (Zw, posy−prevy) with the coordinate (prevx−Zw/2, prevy−Zh/2) as the upper left end is copied at the corresponding position on the display buffer 13. Processing then transfers to step S29.

At step S27, it is judged whether or not prevx=posy. If prevx=posy, processing transfers to step S25 and, if prevx is not equal to posy, processing transfers to step S28.

At step S28, an area of the display image having a size up to a coordinate (Zw, prevy−posy) with the coordinate (prevx−Zw/2, prevy+Zh/2) as the upper left end is copied at the corresponding position on the display buffer 13. Processing then transfers to step S29.

At step S29, prevx is substituted into posx and posy s substituted into prevy. Processing then transfers to step S8 in FIG. 6.

In the above-described first embodiment, the size of the area or frame of an enlarged image displayed on the display screen of the display 20 is sized zw×zh as shown in FIG. 2. This size can be freely changed by acting on a button on the pointing device 18. The enlargement ratio (zooming ratio) of the magnified image can also be set freely. The enlarging ratio of the magnified image or zooming ratio may also be adjusted in accordance with a pre-set algorithm. Although the first embodiment sets Zx=posx−Zw/2 and Zy=posy−Zh/2, this can also be varied in accordance with a pre-set algorithm to a readily visible position.

In the first embodiment, the display image superimposed on the magnified image is rendered readily visible by lowering the display density of the superimposed display image for varying the display density of the superimposed display image superimposed on the enlarged image on the screen. However, the magnified image and the superimposed display image can be changed in color from each other in case the image is displayed in color. If color is changed in this manner between the magnified image and the superimposed display image, the color of the superimposed display image displayed below the magnified image is to be less apparent than the enlarged image, such as grey color.

Figure 9:
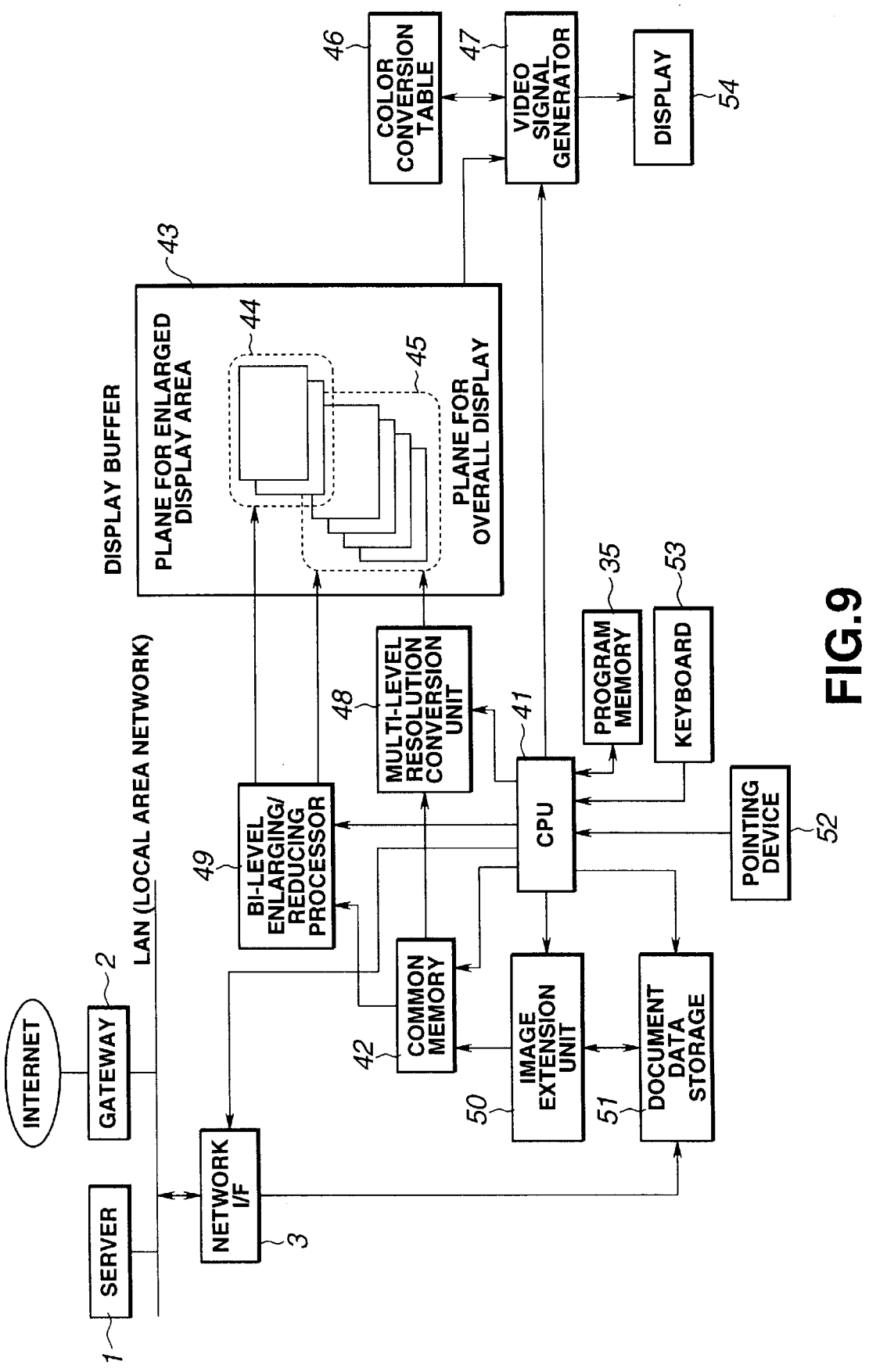
FIG. 9 is a schematic block diagram showing an arrangement of a picture display apparatus according to a second embodiment of the present invention.

As a second embodiment, a mechanism capable of bit-based operation on the display buffer and a system having a color conversion table is explained by referring to FIG. 9. In the present second embodiment, such an arrangement is now explained in which color display is possible and processing in case of displaying the magnified image can be simplified.

Referring to FIG. 9, a CPU 41 commands for a document data storage unit 51 an address of data associated with a file name commanded to be displayed by, for example, a keyboard 53 in accordance with a computer software previously stored in a program memory 35. The file data stored in the document data storage unit 51 is read out responsive to the commands from the CPU 41 so as to be sent to an image development control unit 50.

Similarly to the image development control unit 16, the image development control unit 50 converts data read out from the document data storage unit 51 into bit map format data. The data obtained from processing by the image development control unit 50 is stored in a common memory 42 controlled as to the addresses by the CPU 41.

The original image data in the common memory 42 is read out by the two-valued enlarging/reducing processor 49 in accordance with the instructions by the CPU 41 so that the associated original image data is resolution-converted for matching to the display resolution. The image data from the two-valued enlarging/reducing processor 49 is transiently stored in an overall display plane 45 as later explained and is subsequently read out therefrom so as to be supplied to a video signal generating circuit 47.

The video signal generating circuit 47 generates picture signals from the display image data sent from the display buffer 43. The picture signals are sent to a display 54 so that a display image corresponding to the display image data is displayed on the display 54.

On the display 54, on which the display image is displayed, the cursor, the display coordinates of which are controlled by a pointing device 52, such as a mouse, is displayed by the CPU 41 and is moved to a portion of the display image desired to be displayed to an enlarged scale (an area to be magnified) by the user of the apparatus manipulating the pointing device 52. In addition, the area to be magnified is commanded to be magnified by a magnifying button provided on the pointing device 52.

This causes the CPU 41 to read the coordinates commanded by the cursor and to calculate the coordinate value of the original image data which is stored in the common memory 42 and which is as yet not converted in resolution. In addition, the CPU 41 commands the enlarging/reducing processor 49 to generate magnified image data of the area to be magnified and causes the generated magnified image data to be stored in the corresponding area on the display buffer 43. The magnified image data is stored in a plane for magnified display 44 as later explained.

The image data stored in the display buffer 43 and converted in resolution for display is synthesized with the magnified image data. The video signal generator 47 generates picture signals from the image data for display on the display 54. This causes the magnified picture (magnified image) and the other display image to be displayed on the display 54 while causing the superimposed display image to be simultaneously displayed below the magnified image.

The above-described arrangement and operation are the same as those of the first embodiment except that synthesis of the display image and the magnified image are performed during readout from the display buffer.

In the system of the present second embodiment, the display buffer 43 has a storage area having a depth of 8 bits for each dot on the display 54 and access may be had to each of the eight bits. In a color conversion table storage unit 46 is stored a color conversion table stating the correspondence between the contents of 1 dot for eight bits in the display buffer 43 and the color-density actually displayed on the display 54. Thus the video signal generator 47 converts the dot-value in the display buffer 43 into a video output value, using a color conversion table stored in the color conversion table storage unit 46. A color picture may be displayed by displaying the video output value on the display 54.

In the arrangement of FIG. 8, the color conversion table shown in Tables 1 to 3 is used and lower 4 bits in the display buffer 43 are allocated to the overall display data (display image data) while its upper two bits are used for magnified display. A set of bits of the same bit position is formed for the entire display screen and is termed a plane. In the present embodiment, four planes are stored for overall display (for display image data), while two planes are stored for magnified display (for magnified image data). Thus the display buffer 43 has an overall display plane 45 and a plane 44 for a magnified display area.

TABLE 1

| display buffer value | output value | | |
|---|---|---|---|
| | R | G | B |
| 00000000 | 0 | 0 | 0 |
| 00000001 | 17 | 17 | 17 |
| 00000010 | 34 | 34 | 34 |
| 00000011 | 51 | 51 | 51 |
| 00000100 | 68 | 68 | 68 |
| 00000101 | 85 | 85 | 85 |
| 00000110 | 102 | 102 | 102 |
| 00000111 | 119 | 119 | 119 |
| 00001000 | 136 | 136 | 136 |
| 00001001 | 153 | 153 | 153 |
| 00001010 | 170 | 170 | 170 |
| 00001011 | 187 | 187 | 187 |
| 00001100 | 204 | 204 | 204 |

TABLE 1-continued

| display buffer value | output value | | |
|---|---|---|---|
| | R | G | B |
| 00001101 | 221 | 221 | 221 |
| 00001110 | 238 | 238 | 238 |
| 00001111 | 255 | 255 | 255 |

TABLE 2

| display buffer value | output value | | |
|---|---|---|---|
| | R | G | B |
| 00010000 | 180 | 180 | 180 |
| 00010001 | 185 | 185 | 185 |
| 00010010 | 190 | 190 | 190 |
| 00010011 | 195 | 195 | 195 |
| 00010100 | 200 | 200 | 200 |
| 00010101 | 205 | 205 | 205 |
| 00010110 | 210 | 210 | 210 |
| 00010111 | 215 | 215 | 215 |
| 00011000 | 220 | 220 | 220 |
| 00011001 | 225 | 225 | 225 |
| 00011010 | 230 | 230 | 230 |
| 00011011 | 235 | 235 | 235 |
| 00011100 | 240 | 240 | 240 |
| 00011101 | 245 | 245 | 245 |
| 00011110 | 250 | 250 | 250 |
| 00011111 | 255 | 255 | 255 |

TABLE 3

| display buffer value | output value | | |
|---|---|---|---|
| | R | G | B |
| 00100000 | ZR | ZG | ZB |
| 00100001 | ZR | ZG | ZB |
| 00100010 | ZR | ZG | ZB |
| 00100011 | ZR | ZG | ZB |
| 00100100 | ZR | ZG | ZB |
| 00100101 | ZR | ZG | ZB |
| 00100110 | ZR | ZG | ZB |
| 00100111 | ZR | ZG | ZB |
| 00101000 | ZR | ZG | ZB |
| 00101001 | ZR | ZG | ZB |
| 00101010 | ZR | ZG | ZB |
| 00101011 | ZR | ZG | ZB |
| 00101100 | ZR | ZG | ZB |
| 00101101 | ZR | ZG | ZB |
| 00101110 | ZR | ZG | ZB |
| 00101111 | ZR | ZG | ZB |
| 00110000 | ZR | ZG | ZB |
| 00110001 | ZR | ZG | ZB |
| 00110010 | ZR | ZG | ZB |
| 00110011 | ZR | ZG | ZB |
| 00110100 | ZR | ZG | ZB |
| 00110101 | ZR | ZG | ZB |
| 00110110 | ZR | ZG | ZB |
| 00110111 | ZR | ZG | ZB |
| 00111000 | ZR | ZG | ZB |
| 00111001 | ZR | ZG | ZB |
| 00111010 | ZR | ZG | ZB |
| 00111011 | ZR | ZG | ZB |
| 00111100 | ZR | ZG | ZB |
| 00111101 | ZR | ZG | ZB |
| 00111110 | ZR | ZG | ZB |
| 00111111 | ZR | ZG | ZB |

Table 1 shows the correspondence between the bit values in the display buffer 13 for display image data and output values of the three prime colors red (R), green (G) and blue (B) in case of not performing enlarged display. For example, (R,G,B)=(0,0,0) specifies black and (R,G,B)=(256, 256 ,256 ) specifies white. Table 2 shows the correspondence between the bit values in the display buffer 13 for superimposed display image data and output values of the three prime colors red (R) , green (G) and blue (B) in case of displaying a magnified image. Table 3, on the other hand, shows the color of the magnified image ((R,G,B)=(ZR,ZG,ZB)) when the color of the magnified image is set to, for example, blue black.

In the fi first embodiment, shown in FIG. 2, the enlarging/ reducing processor 15 is simultaneously used for resolution conversion for data of the overall display. In the second embodiment, there is provided a conversion-to-multi-level/ resolution conversion unit 48 for realizing resolution conversion and conversion to multiple levels simultaneously. The conversion-to-multi-level/resolution conversion unit 48 reads out bi-level image data, which is the original image on the common memory 42, and converts it into multi-level image data for prohibiting fine-sized letters to appear collapsed even for a display with lower resolution. However, since the simultaneous conversion-to-multi-level/resolution conversion is time-consuming, an enlarging/reducing processor 49 and an conversion-to-multi-level/resolution conversion unit 48 are operated in parallel, as disclosed in JP Patent Kokai Publication JP-A-4-337800, such that a coarser picture is displayed first and replaced subsequently by a multi-level data for achieving both the speed in reaction and beautiful display simultaneously.

The operation in the arrangement of the second embodiment is now explained by referring to the flowchart of FIG. 9. Since the display buffer is usually 4 or 8 bits in depth, a display buffer having a depth of 8 bits is used and lower 6 bits thereof are employed. By employing the planes, it becomes unnecessary to fetch an area appearing during cursor movement form the common memory 42, such that the original density may be restored by simply setting the portion other than the magnified area to (00) in the plane for enlarged display 44. In addition, since the planes are independent of one another, it is possible for the conversion-to-multi-level/resolution conversion unit 48 to write the produced data in the plane for overall display 45 as asynchronous processing is carried out. However, if display of the next page is to be started before complete preparation of the multi-valued data, the processing needs to be terminated.

Figure 10:
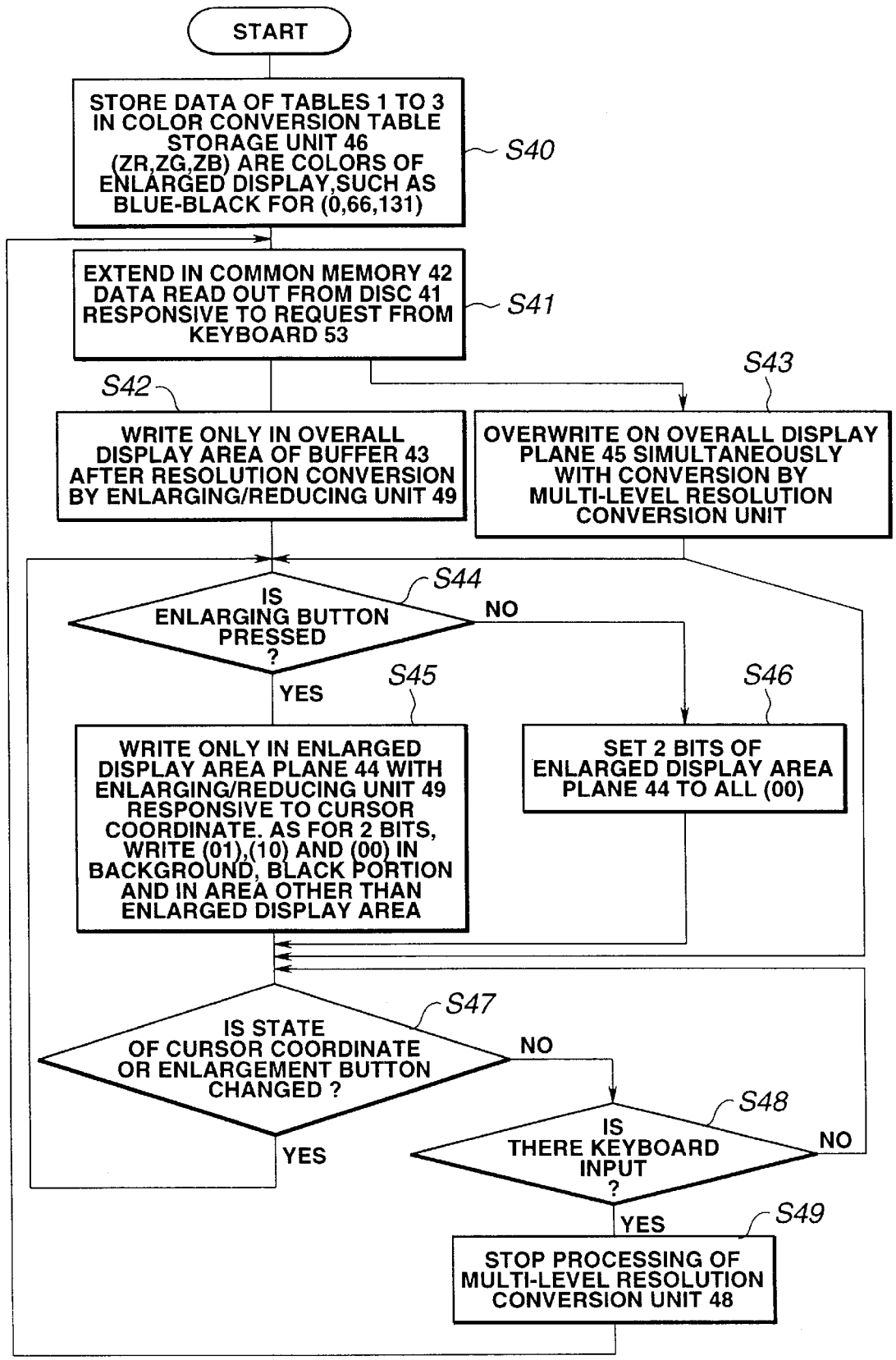
FIG. 10 is a flowchart for showing the overall processing flow of the second embodiment.

In FIG. 10, data of Tables 1 to 3 are stored in tables 1 to 3. In Table 3, (ZR,ZG,ZB) specifies the color of the enlarged display. For example, if (ZR,ZG,ZB)=(0,66,131), the color is a blue-black color.

At step S41, the CPU 41 is responsive to the request by the user via the keyboard 53 to develop data read out from the disc 51 on the common memory 42. Next, as step S42, data obtained after resolution conversion by the enlarging/ reducing processor 49 is overwritten only on the plane for overall display 45. Simultaneously, at step S43, conversion to multi-level data is carried out by the conversion-to-multi-level/resolution conversion unit 48 and overwriting is done only on the plane for overall display 43. Since the processing at step S43 occurs asynchronously, processing then proceeds to step S44 or to step S47.

At the next step S44, it is judged whether or not the magnifying button provided on the pointing device 52 is pressed. If it is judged at the next step S44 that the magnifying button has not been pressed, processing transfers to step S46. If otherwise, processing transfers to step S45.

At step s46, two bits of the plane for enlarged display area 44 are all set to (0,0) before processing transfers to step S47.

At step S45, writing is done only in the plane for magnified display area 44 by the enlarging/reducing processor 49. Using two bits, (0,1) and (1,0) are written the background and black-colored portion, respectively, while (0,0) is written in portions other than the area for magnified display. Then, processing transfers to step S47.

At S47, it is judged whether or not the cursor coordinate has been changed. If, at step S47, the state of the cursor coordinate or the magnifying button has been changed, processing transfers to step S44. If otherwise, processing transfers to step S48.

At step S48, it is judged whether or not an input has been made at the keyboard 53. If there is no input, processing reverts to step S47 and, if there is an input, processing transfers to step S49. At this step S49, the processing at the conversion-to-multi-level/resolution conversion unit 48 is terminated before processing reverts to step S41.

Although the enlarged display area is of a pre-set size, the enlarged display area or the magnifying ratio may be changed by a command from the pointing device or the keyboard. Although the foregoing description is directed to an instance wherein image data is supplied from the document data storage unit 51, the present invention may be applied to instances wherein image data is directly supplied from a network or supplied from a picture inputting device, such as an image reader, a still camera or a digital still camera.

With the embodiments of the present invention, magnified display may be spontaneously achieved in a manner similar to employing a magnifying lens. Since the magnified display and the overall display are made on one and the same display area and free magnification may be achieved, allocation of the size or the position of the display area may be simplified with a so-called window system in which plural application programs are dynamically allocated in the same display area. If there is only one display area, effective allocation may possibly be achieved by a mechanism, known as a window manager, used for controlling allocation of display area. In addition, compatibility between quick display response and detailed display may be achieved, while processing may be simplified.

What is claimed is:

1. A picture display apparatus, comprising:

display means having a display screen for displaying a picture;

specifying means for specifying an optional area of an overall picture displayed on a display screen of said display means;

magnified picture generating means for generating a magnified picture of the area specified by said specifying means;

display control means for superimposing said magnified picture on said overall picture in such a manner that said magnified picture is superimposed on said overall picture and the portion of said overall picture overlapped below the magnified picture is rendered visible and displayed in a same color as and with a lower density than said overall picture on the display screen of the display:

bi-level display control means for initially displaying a picture displayed on the display screen of said display means by bi-level representation; and convert-to-multi-level display control means for displaying in multi-level representation after end of display in bi-level representation.

2. The picture display apparatus as claimed in claim 1 wherein plural bits are used for each pixel of a displayed picture and wherein a conversion table is employed which correlates the contents of the plural bits for each pixel with the display density.

3. The picture display apparatus as claimed in claim 1 wherein said display controlling means processes a picture supplied from an external network for display on a display screen of said display means.

4. A method for displaying a picture using a picture display apparatus having display means having a display screen on which a picture is displayed and specifying means for specifying an optional area of an overall picture displayed on a display screen of said display means, comprising the steps of:

a magnified picture generating step for generating a magnified picture of an area specified by said specifying means;

superimposing said magnified picture on said overall picture in such a manner that said magnified picture is superimposed on said overall picture and the portion of said overall picture overlapped below the magnified picture is rendered visible and displayed in a same color as and with a lower density than said overall picture on the display screen of said display means;

initially displaying a picture displayed on the display screen of said display means by bi-level representation; and displaying in multi-level representation after end of display in bi-level representation.

5. An information recording medium having stored thereon a computer program readable and executable by a picture display apparatus having display means having a display screen on which a picture is displayed and specifying means for specifying an optional area of an overall picture displayed on a display screen of said display means, wherein said computer program comprises the steps of:

generating a magnified picture of an area specified by said specifying means;

superimposing said magnified picture on said overall picture in such a manner that said magnified picture is superimposed on said overall picture and the portion of said overall picture overlapped below the magnified picture is rendered visible and displayed in a same color as and with a lower density than said overall picture on the display screen of said display means;

initially displaying a picture displayed on the display screen of said display means by bi-level representation; and displaying in multi-level representation after end of display in bi-level representation.

6. An information transmission medium having stored thereon a computer program readable and executable by a picture display apparatus having display means having a display screen on which a picture is displayed and specifying means for specifying an optional area of an overall picture displayed on a display screen of said display means, wherein said computer program comprises the steps of:

generating a magnified picture of an area specified by said specifying means;

superimposing said magnified picture on said overall picture in such a manner that said magnified picture is superimposed on said overall picture and the potion of said overall picture overlapped below the magnified picture is rendered visible and displayed in a same color as and with a lower density than said overall picture on the display screen of said display means;

initially displaying a picture displayed on the display screen of said display means by bi-level representation; and displaying in multi-level representation after end of display in bi-level representation.

7. A picture display apparatus, comprising:

a display for displaying a picture;

a specifier that specifies an optional area of the picture;

a magnified picture generator that generates a magnified picture of the area specified by the specifier;

a display controller operable to superimpose the magnified picture on the picture in such a manner that both the magnified picture and the portion of the picture covered by the magnified picture are visible on the display, wherein the display controller displays the magnified picture using a different display density than a display density of the portion of the picture covered by the magnified picture, and wherein the display controller displays the magnified picture in a same color as and with a lower density than the portion of the picture covered by the magnified picture;

a bi-level display controller that initially displays the magnified picture in a bi-level representation; and a multi-level display controller that displays the magnified picture in a multi-level representation after the bi-level representation of the magnified picture has been displayed.

8. The apparatus of claim 7 wherein a plurality of bits are used for each pixel of a displayed picture and wherein a conversion table is employed to correlate the bits for each pixel with the display density of each pixel.

9. The apparatus of claim 7 wherein the display controller processes a picture supplied from an external network for display.

* * * * *

UNITED STATES PATENT AND TRADEMARK OFFICE
CERTIFICATE OF CORRECTION

PATENT NO.   : 6,184,859 B1
DATED        : February 6, 2001
INVENTOR(S)  : Kiyonobu Kojima It is certified that error appears in the above-identified patent and that said Letters Patent is hereby corrected as shown below:

Column 2,
Line 7, change "potion" to -- portion --.
Line 35, change "meas" to -- means --.

Column 3,
Line 32, change "known-as" to -- known as --.

Column 6,
Line 2, change "from" to -- form --.
Line 21, change "form" to -- from --.
Line 40, change "st" to -- at --.

Column 7,
Line 12, change "x>Zh" to -- x$\geq$Zh --.
Line 31, change "y>Zw" to -- y$\geq$Zw --.
Line 33, change "prevx>0" to -- prevx$\geq$0 --.
Line 42, change "prevx>posx" to -- prevx$\geq$posx --.
Line 53, change "prevx>posy" to -- prevx$\geq$posy --.

Column 8,
Line 1, change "s" to -- is --.

Column 11,
Line 10, delete "fi".
Line 35, change "form" to -- from --.

UNITED STATES PATENT AND TRADEMARK OFFICE
CERTIFICATE OF CORRECTION

PATENT NO. : 6,184,859 B1
DATED : February 6, 2001
INVENTOR(S) : Kiyonobu Kojima It is certified that error appears in the above-identified patent and that said Letters Patent is hereby corrected as shown below:

Column 14,
Line 12, change "potion" to -- portion --.

Signed and Sealed this

Twenty-sixth Day of February, 2002

Attest:

Attesting Officer

JAMES E. ROGAN
Director of the United States Patent and Trademark Office